United States Patent [19]
Nelson

[11] 3,941,398
[45] Mar. 2, 1976

[54] GOLF CLUB HOLDER

[76] Inventor: Karl M. Nelson, Box 182, Jewell, Iowa 50130

[22] Filed: Aug. 5, 1974

[21] Appl. No.: 494,634

[52] U.S. Cl......... 280/47.19; 150/1.5 R; 280/DIG. 6
[51] Int. Cl.$^2$........................................ A63C 55/08
[58] Field of Search......... 280/47.19, 47.26, DIG. 6; 150/1.5 R, 1.5 B; 220/9 F; 206/523; 211/60 G

[56] References Cited
UNITED STATES PATENTS

| | | | |
|---|---|---|---|
| 2,902,287 | 9/1959 | Elias | 280/DIG. 6 |
| 3,707,279 | 12/1972 | Kaiser | 150/1.5 R |

FOREIGN PATENTS OR APPLICATIONS

| | | | |
|---|---|---|---|
| 804,722 | 11/1958 | United Kingdom | 280/DIG. 6 |

OTHER PUBLICATIONS

Baumeister & Marks *Standard Handbook for Mechanical Engineers*, McGraw–Hill, seventh Edition 1967, pp. 6–197 to 6–201.

*Primary Examiner*—M. H. Wood, Jr.
*Assistant Examiner*—John A. Pekar
*Attorney, Agent, or Firm*—Kolisch, Hartwell, Dickinson & Stuart

[57] ABSTRACT

Apparatus for transporting golf clubs including a golf club holder comprising an elongate body of foamed plastic material with multiple elongate bores defined in said body extending the length thereof and separated laterally from one another by partition portions in the body. The bores open to the top of the body, and a cover is provided which is positionable to provide a covering for the heads of clubs whose shafts are lodged within said bores. Reinforcing means in the holder includes a base supporting the base of the body and elongate braces extending along the outside and longitudinally of said body. Wheeled structure is disclosed including wheels which roll over the ground and a handle for manipulating the structure.

5 Claims, 5 Drawing Figures

U.S. Patent  March 2, 1976  3,941,398
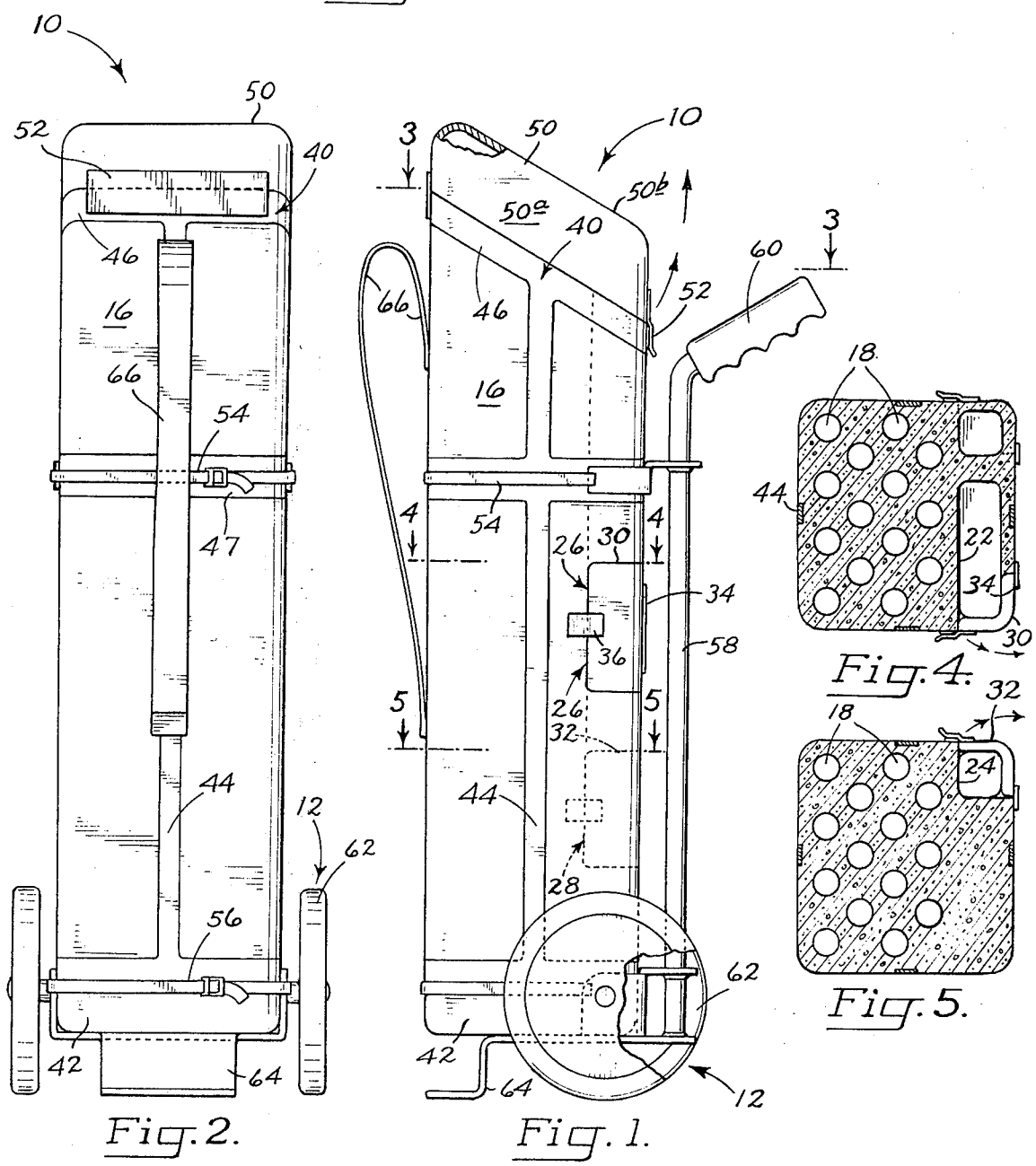

GOLF CLUB HOLDER

This invention relates generally to apparatus for transporting golf clubs.

Various types of golf bags and the like have been proposed in the past for the carrying of golf clubs. Many types of bags have been so massive and bulky that it has been inconvenient for the player himself to carry the bag, requiring either that a cart be used, or that resort be made to the services of a caddy. Bags intended primarily to be carried have tended to be relatively flimsy and lacking in stiffness, so that when the same are secured to a cart as may be desired on occasion, they twist and distort, with the result that they ride improperly on the cart, and it is difficult to remove a given club as the occasion demands. Furthermore, bags of this description rarely have means for keeping the various clubs separated in the bag, so that clubs tend to become mixed and it is difficult rapidly to make a club selection.

One general object of the invention is to provide an improved holder for clubs, which for a given size is relatively light, and which obviates many of the difficulties noted above characterizing conventional constructions. The holder may be carried easily, and also is suitable for cart use.

Another object is to provide apparatus for transporting clubs which includes novel divider structure defining separate receptacles for the shafts of the different clubs in a set, thus enabling the clubs to be kept separate from each other in the holder.

More specifically, as contemplated herein the apparatus comprises an elongate body of foamed plastic material, having elongate bores defined in said body with upper ends opening to the top of the body adapted to receive the shafts of the various clubs. Within the body the bores are laterally spaced from each other by partition portions defined by the foamed plastic material making up the body. These partition portions have the effect of imparting rigidity to the structure as a whole. Because of the foamed composition of the body, the body has relatively light mass, and weighs substantially less than conventional bags provided with sleeves and the like for holding the shafts of clubs.

A further feature and object of the invention is the provision of apparatus for transporting clubs which includes a cover hinged adjacent the top of the body as described, which is positionable over the top end of the body to form a closed chamber which houses the heads of the clubs stored in the device. With the clubs held in spaced-apart relation by the body of the device, and with such cover overlying the heads, the club heads are effectively protected from damage and wear, eliminating the need for head covers and the like.

Other objects and features of the invention relate to reinforcing means in the holder serving to provide reinforcement at the bottom and adjacent the top and along the length thereof, and which may be utilized in mounting the hinged cover described, as well as means used in handling the holder, whether it be by carrying it, or by attaching it to cart structure.

These and other objects and advantages are attained by the invention which is described in conjunction with the accompanying drawings, wherein:

FIG. 1 is a side elevation of apparatus including cart structure and a holder, or golf bag, as contemplated herein;

FIG. 2 is another side elevation; and

FIGS. 3, 4 and 5 are cross-sectional views, taken along the lines 3—3, 4—4 and 5—5, respectively, in FIG. 1.

Referring now to the drawings, in the preferred embodiment of the invention illustrated, the apparatus comprises a holder or golf bag portion, shown generally at 10, mounted on a cart or wheeled structure 12, to enable the apparatus as a whole to be rolled over the ground.

The golf bag portion 10 includes an elongate body 16 made of a foamed plastic composition, such as a foamed polyurethane, polyethylene, polystyrene, or foamed epoxy material, i.e., a rigid foamed plastic. The body may be of a molded, one-piece construction, and by reason of the foamed nature of the plastic material, has considerably lighter mass than the bodies of known bags of comparable size. If desired, the body may be coated with a vinyl overlay or other material if protection of the body is desired. Formed in the body of the bag during the manufacture thereof are elongate bores, such as those shown at 18 with top ends that open to the top end of the body, and ordinarily terminating a slight distance inwardly from the base of the body so as to leave closed bottom ends for these bores. The bores in the body are separated from each other by partition portions 20. The bores constitute elongate receptacles adapted to receive the shafts of the various clubs in a golf set. Partition portions 20 contribute rigidity to the body as prepared. With the bores laterally spaced from each other in the body, the shafts of the clubs are held with the various clubs separated from one another.

Body 16 may also be prepared with a cavity, such as that shown at 22, and a chamber 24, with cavity 22 adapted to hold balls, tees and miscellaneous items, and chamber 24 a stack of beverage containers. In the particular embodiment of the invention illustrated, the cavity and chamber described open to the top of the body, as well as to the side, at locations indicated at 26 and 28. Covers 30, 32 close off the openings. Each cover is hinged as by a nylon hinge 34 to the body 16, and is secured in its closed position by any suitable means, as with a Velcro type fastener shown at 36, the latter being characterized by coacting pieces which press together to hold, but which may be pulled apart by flexing and pulling one of the pieces from the other.

By reason of the insulative properties of the foamed plastic making up the body, the bag is particularly suitable for holding beverages such as cans of beer, or soft drinks. In extreme conditions, and where permitted, the cavity for the golf balls may be maintained warmed as with a heater, with the insulative properties of the body being effective to retain the heat generated.

The body is reinforced by reinforcing means shown generally at 40. In the particular embodiment shown, such comprises a base 42, support braces 44 extending the length of the bag along the sides thereof joined to the base 42, a band 46 encircling body 16 adjacent the top thereof with the lower margins joined to support braces 44, and a band 47. The reinforcing means may be made of a number of different materials such as heavy plastic, light metal, etc. By including the reinforcing means, a scuff resistant base is imparted to the bag and additional rigidity is added to the sides. Furthermore, the reinforcing means may be utilized in securing the bag to the wheel structure or cart shown supporting it in the drawings.

Closing off the top of the holder or bag is a top cover 50. The cover is hinged to the bag as by the nylon hinge shown at 52 interconnecting the cover to band 46.

The cover, which may be a molded article, or otherwise constructed of sheet material, includes depending margins 50a and a top 50b. With the cover positioned as shown in FIG. 1, whereby it closes off the top of the bag, the top is spaced from the top end of the body, and there is defined by the underside of the cover a chamber at the top of the bag which encloses the heads of the clubs seated within the receptacles provided by bores 18. With the cover closing off the top of the bag, the heads of the clubs are protected from the weather and from damage. By reason of the cover, the need for golf head covers is eliminated.

The cover is held closed by fastener 52 which may be a Velcro type fastener as described in connection with covers 30, 32.

The golf bag may be secured to the cart or wheel structure 12 utilizing, by way of example, the strap fastener means 54, 56 extending from the reinforcing structure and joined to the framework of the cart. Included in the framework of the cart is shaft 58 which parallels one side of the bag. The cart or wheeled structure further includes the usual handle 60 for manipulating the assembly. Wheels 62 on either side and at the base of the cart accommodate movement of the cart over the ground. Stand 64 is utilized to hold the cart upright when the cart is not in motion.

Also part of the reinforcing structure 40 is the strap means shown at 66 having ends secured to on one of the braces 44. This may be utilized in transporting the bag when the same is not to be used with the cart.

While a particular embodiment of the invention has been described including reinforcing structure and fastening means for securing it to the cart, it should be obvious that other systems of attachment may be utilized. Furthermore, while specific means has been described for holding beverages and miscellaneous equipment, it should be obvious that other types of pouch arrangements and receptacles can be incorporated with the bag other than the specific construction described.

The bag contemplated in summary is relatively light in mass. It provides a means for holding the clubs in the set with such separated from each other. The heads of the various clubs are protected by the cover. The bag is adapted for use in conjunction with the wheeled structure or cart described, or by carrying it, utilizing the strap structure described.

While a specific embodiment of the invention has been described, it is not intended to be limited to the particular details thereof, as variations would be apparent to one skilled in the art.

It is claimed and desired to secure by Letters Patent:

1. A golf club holder comprising an elongate body of rigid foamed plastic composition, said body having multiple elongate bores defined therein extending longitudinally of the body and separated laterally from one another by partition portions in said body which contribute rigidity to the body, said bores having top ends opening to the top end of said body and being adapted to receive the shafts of golf clubs, multiple strap portions encircling and snugly encompassing said body at regions distributed along the length of said body with the rigid foamed plastic composition of said body maintaining the shape of said body and thus the snug encompassing relation of said strap portions about said body, and means secured to said body through said strap portions presented on the outside thereof adapting the holder for transport.

2. A golf club holder comprising an elongate body of rigid foamed plastic composition, said body having multiple elongate bores defined therein extending longitudinally of the body and separated laterally from one another by partition portions in said body that contribute rigidity to the body, said bores having top ends which open to the top of said body and are adapted to receive the shafts of golf clubs, multiple strap portions encircling and snugly encompassing said body at regions distributed along the length of said body with the rigid foamed plastic composition of said body maintaining the shape of the body and thus the snug encompassing relation of said strap portions about said body, and a cover hinged to a strap portion adjacent the top of said body swingable to a position overlying the top of said body with the cover defining a chamber between the base of the cover and the top ends of said bores.

3. The holder of claim 2 which further includes a reinforcing brace extending the length of the body along one side thereof and connected to said strap portions.

4. The holder of claim 2 and which further includes a compartment in said body opening to a side thereof with said foamed plastic material of said body forming sides of said compartment.

5. Apparatus for transporting golf clubs comprising an elongate body of rigid foamed plastic material, said body having multiple elongate bores defined therein extending longitudinally of the body and separated laterally from one another by partition portions of said body contributing rigidity thereto, said bores having top ends which open to the top of said body and being adapted to receive the shafts of golf clubs.

multiple strap portions encircling and snugly encompassing said body at regions distributed along the length of said body with the rigid foamed plastic material of said body maintaining the shape of the body and thus the snug encompassing relation of said strap portions about said body, said strap portions including one adjacent the base of said body having an integral floor portion which extends under the base of the body, a strap portion adjacent the top of the body, and a strap portion intermediate the first and second-mentioned strap portions, a cover hinged to the strap portion adjacent the top of said body swingable to a position overlying the top of said body with the cover defining a chamber between it and the top of the body for receiving the heads of clubs, and wheeled means secured to said body through said strap portions including ground-supporting wheels adapting the body for transport over the ground and a handle provided for the manipulation of said wheeled means.

* * * * *